Jan. 20, 1953      H. T. MERYMAN      2,626,358
ELECTRON MICROSCOPE FOCUSING DEVICE
Filed Aug. 12, 1949      2 SHEETS—SHEET 1
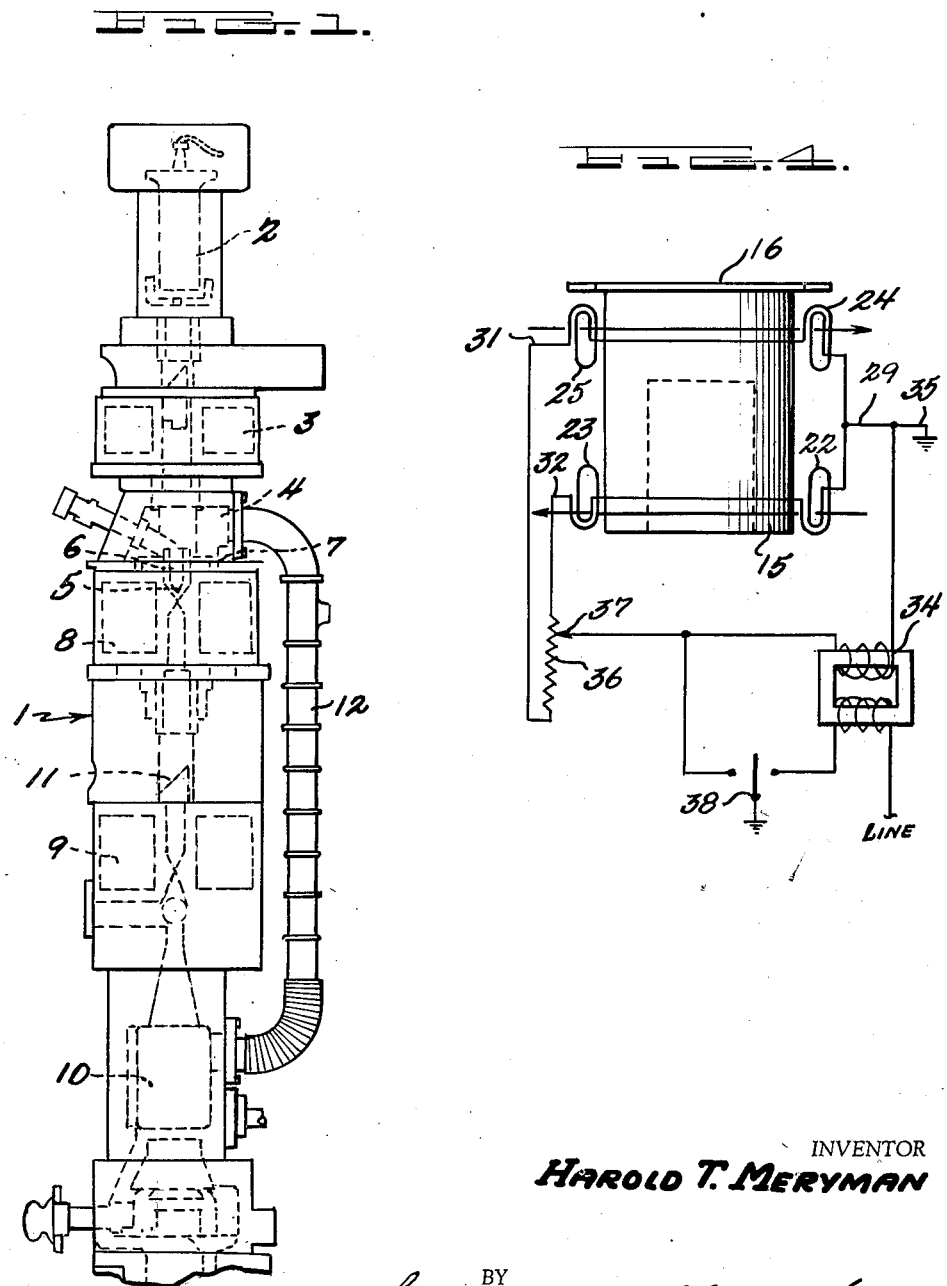
INVENTOR
*HAROLD T. MERYMAN*
BY
*Semmes, Keegin, Robinson + Semmes*
ATTORNEYS

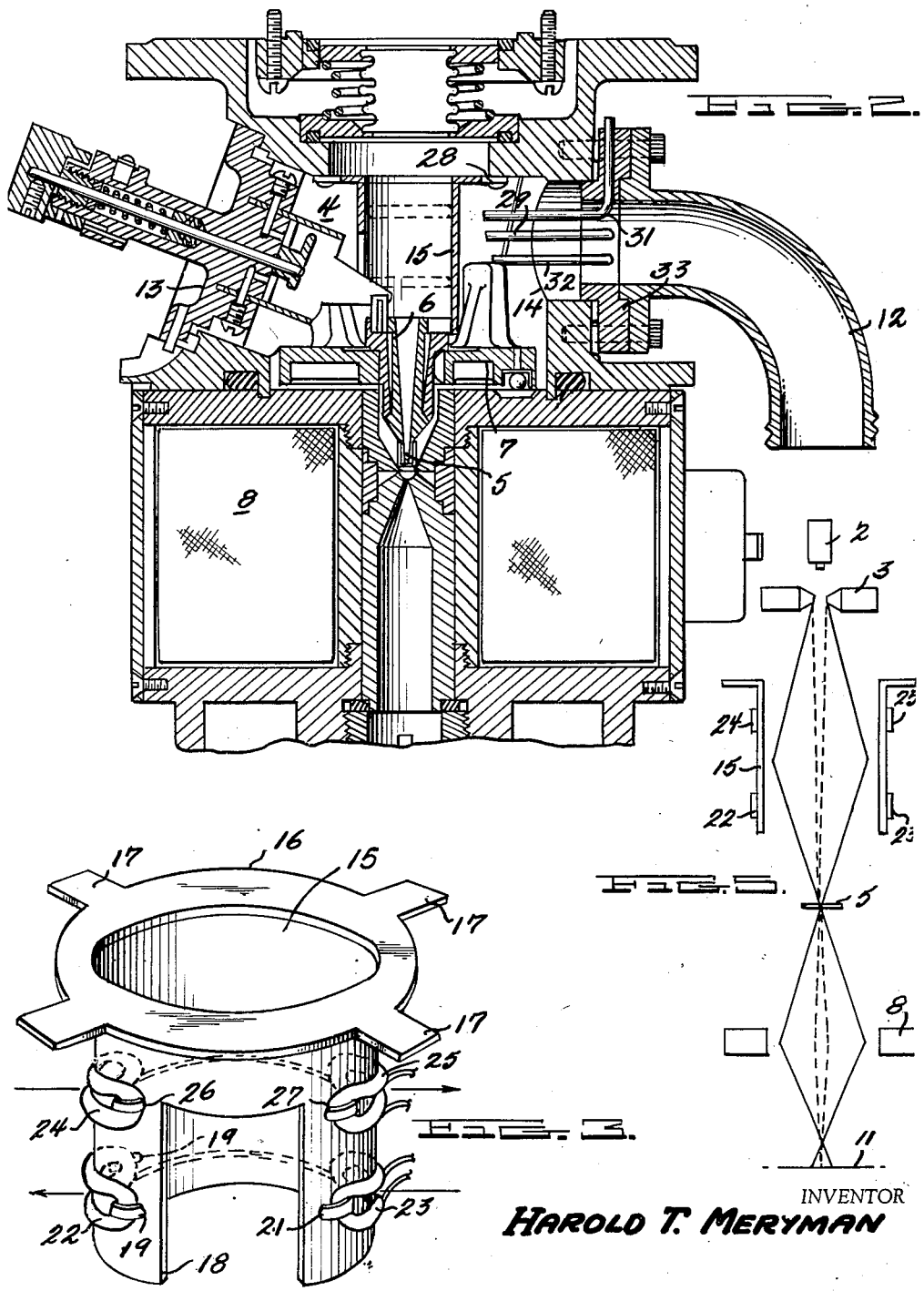

Patented Jan. 20, 1953

2,626,358

UNITED STATES PATENT OFFICE 2,626,358

ELECTRON MICROSCOPE FOCUSING DEVICE

Harold T. Meryman, Cabin John, Md., assignor to Canal Industrial Company, Cabin John, Md., a corporation of Maryland Application August 12, 1949, Serial No. 109,840

6 Claims. (Cl. 250—49.5)

This invention relates to an electron microscope, and more particularly to an attachment to aid in the focusing of an electron microscope.

Considerable difficulty has been encountered in the focusing of electron microscopes because the final image produced by the microscope has much finer detail than can be resolved by human eye. If the microscope is not accurately focused, large errors in the calculations of sizes of specimens observed under the microscope will result. A number of methods have been developed in an effort to improve the focusing of the electron microscopes. In one of these, a series of photographs of the object being observed are taken as the focus of the microscope is changed from one side to the other of the true focus. Obviously, this method is time consuming and causes waste of many photographic plates.

Another method of improving the focusing of electron microscopes is to increase the angle of the aperture through which electron beams pass to the specimen being observed during the focusing operation. The increased angle of the aperture reduces the range of apparent focus of the microscope to a very critical point. After focus has been obtained, the aperture is reduced to increase the resolution of the microscope and the image of the specimen is photographed. Unfortunately, when the aperture is decreased, the intensity of the illumination of the specimen is decreased which in turn changes the focus of the microscope. For this reason, there is a tendency of the specimen to drift between the time of focusing and the time of observing or photographing the specimen.

An attachment for improving the focusing of electron microscopes has been developed in which parallel plates having an electrostatic charge, are positioned against the electron beam of the microscope. The electrostatic charge on the plates deflects the electron beam to produce an effect similar to increasing the angle of the aperture with the exception that the illumination of the specimen is not altered. With this attachment, the apparent range of focus is decreased to allow more accurate focusing of the microscope. An objection to the use of electrostatic means for aiding in focusing the microscope is that relatively high voltages of the order of 250 volts must be maintained on the plates to deflect the electron beam, resulting in a serious hazard to the user of the microscope. Moreover, the electrostatic attachments are delicate, and the plates adjacent the electron beam must be maintained in a true parallel relationship if accurate results are to be obtained.

It is an object of this invention to provide a safe, simple, rugged attachment for an electron microscope to aid in its focusing.

A further object of this invention is to provide a focusing attachment for an electron microscope employing electromagnetic forces to deflect the electron beam of the microscope.

Another object is to provide a method of focusing an electron microscope.

Still another object of this invention is to provide an electromagnetic focusing device without hysteresis, thereby eliminating the electromagnetic forces immediately after the microscope has been focused.

This invention also has as an object the provision of a focusing aid for an electron microscope of conventional design which may be permanently mounted in the microscope and left in position while the specimens being observed by the microscope are changed.

With these and other objects in view, as will become more apparent in the following detailed description, this invention resides in coils producing an electromagnetic force positioned in an electron microscope to deflect the electron beam of the microscope from its normal path to strike the specimen at a wide angle and thereby reducing the range of apparent focus to a narrow, critical range.

In the drawings:

Figure 1 is a fragmentary front elevational view of a typical electron microscope in which the focusing attachment of this invention is mounted;

Figure 2 is a fragmentary cross-sectional view of a portion of the electron microscope illustrated diagrammatically in Figure 1, showing the installation of the focusing attachment comprising this invention;

Figure 3 is a perspective view of the electromagnetic focusing attachment prior to mounting within the microscope;

Figure 4 is a wiring diagram showing one means for controlling the electromagnetic forces exerted by the focusing attachment of this invention; and, Figure 5 is a diagrammatic view of the electromagnetic attachment of this invention showing the path followed by the electrons to the specimen.

A conventional electron microscope, designated generally by 1 is illustrated in Figure 1, in which an electron gun 2 is mounted at the upper end of the microscope and discharges an electron beam downward along a vertical axis. The electron beam passes through a condenser lens 3, which directs the beam through a specimen chamber 4, onto the specimen 5. Specimen 5 is mounted in a suitable specimen holder 6, which may be moved horizontally on a specimen stage 7.

An objective lens 8 and a projection lens 9 reproduce an image of the specimen suitable for photographing in the usual manner on a screen 10. An intermediate screen 11 is generally provided for viewing an image at low magnification. Lens 3, 8, and 9 are generally connected to variable sources of electrical energy permitting the focusing of the lens. Electron microscope 1 is equipped with a vacuum manifold 12, opening into the specimen chamber 4, and the chamber in which the screen 10 is mounted, to allow evacuation of the microscope. A suitable vacuum pump, not shown, is connected to the manifold.

Referring to Figure 2 of the drawings, in which the specimen chamber 4 is shown in cross-section, a specimen door 13 is provided in one side of the chamber to permit the positioning of a specimen holder 6 in the path of the electron beam. Evacuation of the specimen chamber 4 is accomplished through a port 14, communicating with the vacuum manifold 12.

The focusing attachment of this invention, best illustrated in Figure 3 of the drawings, consists of a tube 15 of brass or other suitable material having a very low hysteresis. Tube or tubular support 15 has a flange 16 at its upper end from which lugs 17 extend. A slot 18 is provided in the lower end of tube 15 for alignment with the specimen door 13 when the tube is mounted in an electron microscope.

A pair of pins, mounting projections or coil mounts 19 extend from the outer surface of the tube 15 equal distances from the lower end of the tube, and a pair of similar pins 21 are mounted on the outer surface of tube 15 directly opposite pins 19. A pair of coils 22 and 23 of insulated electromagnetic wire are wrapped around the pins 19 and 21, respectively, and are held firmly in place by the pins. Coils 22 and 23 are connected in series and are wound in a direction to produce electromagnetic forces in the same direction as a current is passed through the coils, thereby being equivalent to a single large coil. Care must be taken to avoid short circuits in the coils and between the coils and the tube 15.

The number of turns in the coils will depend upon the voltage supply with which they are connected, the spacing of the coils from the electron beam, the characteristics of the wire used, etc. Coils of 400 turns each of No. 36 Format insulated magnet wire mounted on a one and one-half inch outside diameter brass tube 15 have been found to be satisfactory when connected to a six-volt source of alternating current.

Directly above coils 22 and 23 are coils 24 and 25 supported by pins, mounting projections or coil mounts 26 and 27, respectively, extending from the outer surface of tube 15. Coils 24 and 25 are similar to coils 22 and 23 and may contain the same number of turns of insulated magnet wire. Coils 24 and 25, however, are wound to produce an electromagnetic force directly opposite in direction to that produced by coils 22 and 23.

Tube 15 is held in position in the specimen chamber 4 by the stage motion spring screws 28, which engage the lugs 17 extending from flange 16. Tube 15 extends downwardly to a position just above the specimen stage 7 permitting movement of the stage, and is aligned with the slot 18 permitting access to the specimen holder 6 through specimen door 13. Electrical connections for energizing the coils 22, 23, 24, and 25 are provided by leads 29, 31, and 32 which pass through and are insulated from a bushing 33. Bushing 33 is adapted to fit between the vacuum manifold 12 and the specimen chamber 4 of the microscope. The openings in bushing 33 through which the leads 29, 31, and 32 pass are sealed to prevent the entrance of air into the microscope.

Tube 15 and bushing 33 provide means for supporting and positioning the coils in an electron microscope not originally constructed with a focusing attachment. The coils 22, 23, 24 and 25 may be supported directly on the walls of the microscope, for example, when the microscope is originally supplied with the focusing apparatus. It is essential, however, that the coils be positioned where the electromagnetic forces they develop will produce sufficient controlled deflection of the electron beam to increase the angle at which the beam strikes the specimen.

Referring to Figure 4 of the drawings, in which electrical connections for energizing the coils are illustrated diagrammatically, one terminal of both the upper and lower pairs of coils is connected to lead 29 which in turn is connected to one secondary terminal of a six-volt transformer 34. The lead 29 is grounded at 35 to the chassis of the electron microscope. Lead 32 which is connected to the other terminal of the lower pair of coils is connected to one end of a potentiometer 36, and lead 31 from the second terminal of the upper pair of coils is attached to the other end of the potentiometer 36. The sliding contact 37 of potentiometer 36 is connected to the secondary of the transformer 34 and also to one pole of a double throw switch 38. The other pole of switch 38 is connected to the primary of transformer 34, which is connected to a 110-volt source of A. C. current. In some instances, it may be desirable to connect the coils to an oscillator producing a square wave voltage rather than to the transformer 34. More accurate focusing of the microscope may be obtained, but, of course, the cost of the apparatus is seriously increased when a square wave oscillator is employed.

In the operation of the invention, the switch 38 is closed to energize the primary of the transformer 34 which in turn energizes both pairs of coils mounted on the outer surface of tube 15. The electromagnetic force exerted by the two pairs of coils is adjusted by means of potentiometer 36 to bring the upper and lower coils in balance, at which time there is no loss of illumination of the specimen as compared to when the focusing attachment is not connected.

The alternating current passing through coils 22, 23, 24 and 25 will repeatedly reverse the polarity of the electromagnetic forces exerted by the coils to deflect the electron beam first to one side and then to the other. In Figure 5 of the drawings, the path followed by the electron beam to the intermediate viewing screen 11 has been shown diagrammatically. Actually, the focusing would be performed while viewing the screen 10, but to simplify the operation of the device and the drawings, the path of the beam past the intermediate image is not shown. While focusing, the electron beam follows the solid lines in Figure 5 to form a blurred image on screen 11. Objective lens 8 is then focused in the usual manner for electron microscopes not equipped with a focusing attachment by adjusting the current passing through the lens until a sharp image is formed on the screen. The focusing attachment is then disconnected by throwing switch 38 to the opposite pole which grounds the potentiometer 36 at both ends of the coils.

After the focusing attachment has been disconnected electrically, the electron beam follows its normal path striking the speciment at a very small angle to allow high resolution in the final image. Since the illumination of the specimen is not altered when the focusing attachment is disconnected, there is no tendency of the specimen to drift after focusing and during the photographing exposure.

The electromagnetic focusing attachment of this invention is rugged and the positioning of the coils is not critical since balancing of the coils can be obtained by means of the potentiometer controlling the current to the coils. A high voltage is not necessary and all electrically charged parts are completely insulated, thereby eliminating the safety hazards present in electrostatic devices. The electromagnetic focusing attachment is particularly adaptable for installation on electron microscopes which were not designed for such attachments, and which have been focused only with difficulty heretofore.

This invention permits accurate focusing of the electron microscope and eliminates the necessity of through focus studies for most uses of the microscope. The attachment may be used alone where resolution of not less than fifty angstroms is required. Where exceptional resolution is necessary, the attachment may be used in combination with through focus studies.

While this invention has been described in detail with respect to a particular modification of the invention, it is to be understood that the concept of this invention is not limited to those details, but is determined by the scope of the appended claims.

I claim:

1. In an electron microscope in which an electron beam passes through a condenser lens to a specimen, the improvement of a focusing device comprising a tube positioned between the condenser lens and the specimen to allow the electron beam to pass therethrough, a first coreless coil mounted on the outer surface of the tube, a second coreless coil mounted on the outer surface of the tube, and an electrical energizing source connected to the said coils whereby the coils exert electromagnetic forces in the same direction to deflect the electron beam whereby the width of the angle of the electron beam striking the specimen is increased.

2. In an electron microscope in which an electron beam passes through a condenser lens to a specimen, the improvement of a focusing device comprising a tube positioned between the condenser lens and the specimen to allow the electron beam to pass therethrough, a first coreless coil mounted on the outer surface of the tube, a second coreless coil mounted on the outer surface of the tube, an electrical energizing source connected to the said coils whereby the coils exert electromagnetic forces in the same direction to deflect the electron beam whereby the width of the angle of the electron beam striking the specimen is increased to increase the sensitivity of focus, and means connected to both of said coils for controlling the current through each of the coils to balance the electromagnetic forces exerted by the coils.

3. In an electron microscope of the type having an electron source, condenser lens adapted to direct an electron beam onto a specimen stage, and specimen door providing access to the stage, a focusing tube attachment secured at an upper end within the electron microscope in a position allowing the electron beam to pass through it to the specimen, the lower end of said tube being slightly above the specimen stage, said tube having a slot in alignment with the specimen door, a first coreless coil mounted on the outer surface of the tube, a second coil having a polarity opposite that of the first said coil, a source of alternating current connected to each of the coils whereby they exert an electromagnetic force deflecting the electron beam before it strikes the specimen stage to increase the angle of the electron beam striking the specimen, and means connected to both of said coils for adjusting the current through the two coils to balance their deflection of the electron beam.

4. A focusing attachment for an electron microscope of the type having an electron source, condenser lens directing an electron beam onto a specimen stage, and specimen door providing access to the stage, said focusing attachment comprising a tube attached at its upper end within the electron microscope in a position allowing the electron beam to pass through it to the specimen, the lower end of said tube being slightly above the specimen stage, said tube having a slot in alignment with the specimen door, a first coreless coil mounted on the outer surface of the tube, a second coreless coil mounted on the outer surface of the tube having a polarity opposite that of the first said coil, a source of alternating current connected to each of the said coils whereby they exert an electromagnetic force deflecting the electron beam before it strikes the specimen stage to increase the angle of the electron beam striking the specimen, and means connected to both of said coils for adjusting the current through the two coils to balance their deflection of the electron beam.

5. A focusing device adaptable to an electron microscope of the type wherein an electron beam is first directed through a condenser lens to a specimen thence to an objective lens, comprising a non-magnetic tubular support positioned between condenser lens and specimen, groups of non-magnetic coil mounting projections formed upon the tubular support, corresponding groups of coils wound upon the mounting projections of the support to form electromagnetic forces of the same polarity, the said forces corresponding to groups of mounting projections, an electrical energizing source connected to one end of each coil in each said group whereby electromagnetic forces may be exerted in opposite directions as between said groups to alternately deflect and alternately return the electron beam for increasing width of the angle of the electron beam striking the specimen, and means connected to an opposite end of each said coil for controlling the current through each of the coils to balance the electromagnetic forces exerted by the coils.

6. A focusing device adaptable to an electron microscope of the type wherein an electron beam is first directed through a condenser lens to a specimen thence to an objective lens, comprising a non-magnetic tubular support positioned between condenser lens and specimen, a first group of non-magnetic coil mounts having diametrically opposed mounts formed upon the support, and a second group of non-magnetic mounts having diametrically opposed mounts upon the support, corresponding groups of coils secured to the mounts to form electromagnetic support of the same polarity corresponding to each said group of coil mounts, an electrical energizing source connected to one end of each coil in each said group whereby electromagnetic forces may be exerted in opposite directions as between said groups to alternately deflect and alternately return the electron beam for increasing width of the angle of the electron beam striking the specimen, and means connected to an opposite end of each said coil for controlling the current through each of the coils to balance the electromagnetic forces exerted by the coils.

HAROLD T. MERYMAN.

REFERENCES CITED

The following references are of record in the file of this patent:

UNITED STATES PATENTS

| Number | Name | Date |
|---|---|---|
| 1,945,980 | Parker | Feb. 6, 1934 |
| 2,464,396 | Hillier et al. | Mar. 15, 1949 |
| 2,494,442 | Le Poole | Jan. 10, 1950 |